United States Patent [19]
Wang

[11] Patent Number: 4,966,128
[45] Date of Patent: Oct. 30, 1990

[54] GAS SOLDERING IRON

[76] Inventor: Chin-Fu Wang, No. 2, Sublane 10, Lane 136, Sec. 3, Chung Shan Road, Chung Ho City, Taipei Hsien, Taiwan

[21] Appl. No.: 388,875

[22] Filed: Aug. 3, 1989

[51] Int. Cl.$^5$ .............................................. B23K 3/00
[52] U.S. Cl. .................................... 126/414; 126/413
[58] Field of Search ................. 126/413, 414, 403, 406

[56] References Cited

U.S. PATENT DOCUMENTS

| | | | |
|---|---|---|---|
| 4,641,632 | 2/1987 | Nakajima | 126/413 |
| 4,785,793 | 11/1988 | Oglesby et al. | 126/413 |
| 4,805,593 | 2/1989 | Hsu | 126/414 |

Primary Examiner—Carroll B. Dority
Attorney, Agent, or Firm—Lowe, Price, LeBlanc, Becker & Shur

[57] ABSTRACT

A gas soldering iron comprises a gas cylinder for storage of gas, a lower holder plate fixedly mounted on the gas cylinder at the top, which lower holder plate is connected with a T-shaped mechanism having set therein an elongated conduit tube and a movable tube to further match with a switching element, a gas jet cap, a spring and a revolving knob so as to control gas flow rate. The released gas from the cylinder through the T-shaped mechanism is further passing through a upper holder plate wherein the gas is mixed with the circulated air to further run through metal tubular element for producing a fire to heat the soldering head for performing soldering process.

4 Claims, 4 Drawing Sheets

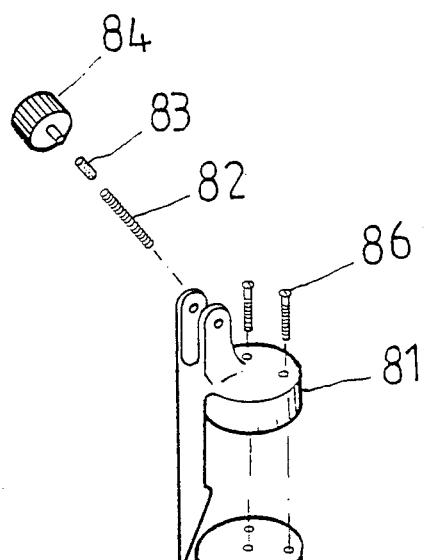
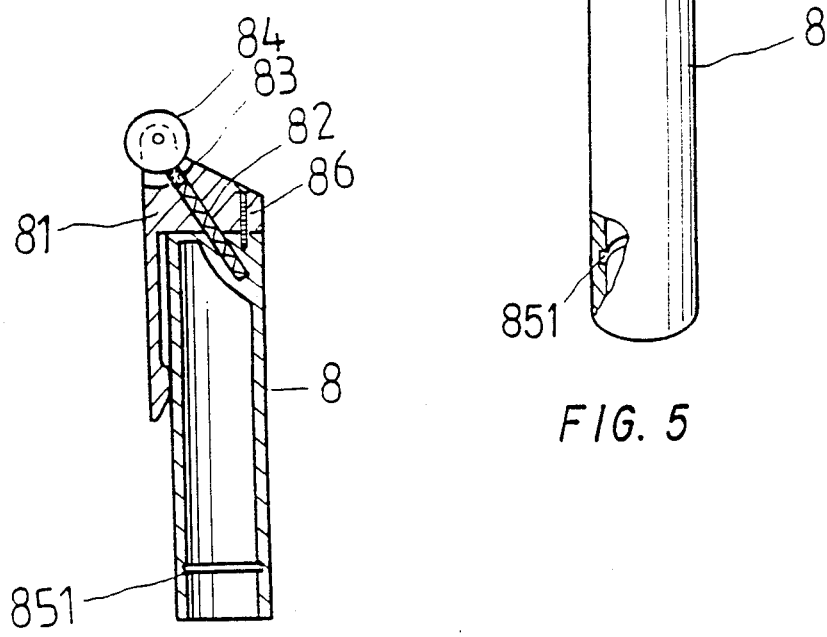
FIG. 5
FIG. 6

GAS SOLDERING IRON

BACKGROUND OF THE INVENTION

In the manufacturing process of printed circuit boards, the electronic component parts are normally connected through fully automatically controlled welded joint. Therefore, the whole process is quite simple and suitable for mass production. Through mass production the cost of electric as well as electronic consumer's goods has been continuously reducing and all kinds of electric and electronic consumer's goods have been getting popular. However, after a certain period of service, the circuit boards, component parts or the soldering areas may be damaged or broken and shall have to be repaired. For the repair or maintenance of electric or electronic home appliances, welding run or soldering iron is the most wanted tool to be prepared. In consideration of economic effects, soldering iron is commonly used by the consumers and electric home appliances stores. Regular soldering irons may use electric power or gas as the heating source. In comparison with electric soldering iron gas soldering iron is more convenient to carry with oneself for use wherever on does, and is free from the limitation of electric outlet, and when in use, more particularly during experimentation process, no electric shock problem is to be worried, and no electric wires will be hindered. However, conventional gas soldering irons are more complicated in structure, more expensive to manufacture and the service life of which is relatively short. Therefore, gas soldering iron is still not widely accepted by the consumers.

The present invention is to provide an improved structure of gas soldering iron having numerous features including:

(1) Simple structure, easy to assemble;
(2) Minimized component parts, reduced cost;
(3) Efficient gas outlet control, high combustion efficiency The present invention can provide a time efficiency several times over the conventional soldering irons.

SUMMARY OF THE INVENTION

The present invention is to provide a kind of gas soldering iron which has a relatively simple structure and can extend the effective period of the gas burned, and which is including a gas cylinder for storage of gas, to match with an elongated conduit tube, a movable tube, and a switching element when the switching element is driven to move upward along the tracks of a holder gate, the gas is turned on to pass through the gas jet of a cap and to eject through the boring bore of a metal tube to produce a flame by means of an ignitor so as to heat the cap-shaped soldering head for performing soldering process.

BRIEF DESCRIPTION OF THE DRAWINGS

FIG. 5 is a fragmentary view of the ignitor according to the present invention; and FIG. 6 is a sectional view of the ignitor according to the present invention.

DETAILED DESCRIPTION OF THE PREFERRED EMBODIMENTS

Figure 3:
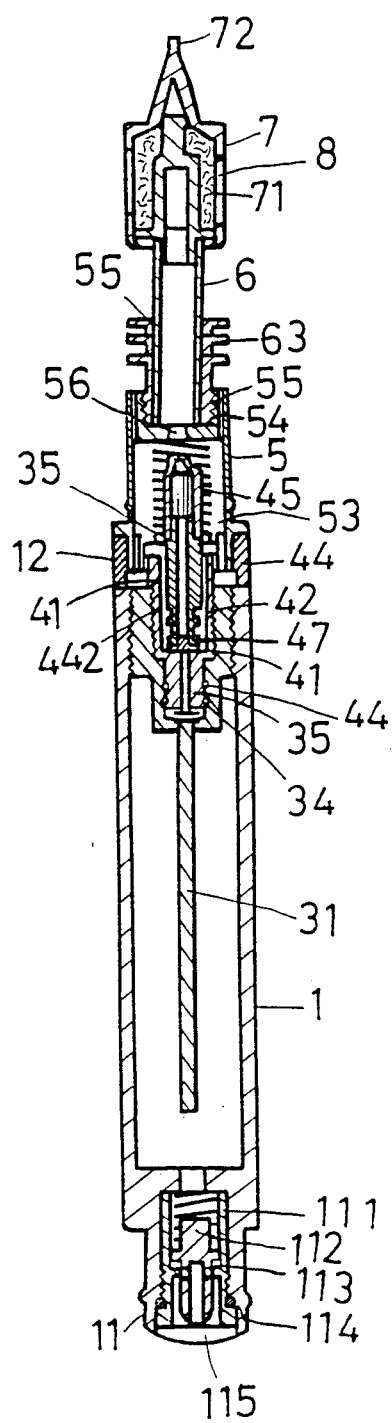
FIG. 3 is a sectional elevation of the present invention.
Figure 1:
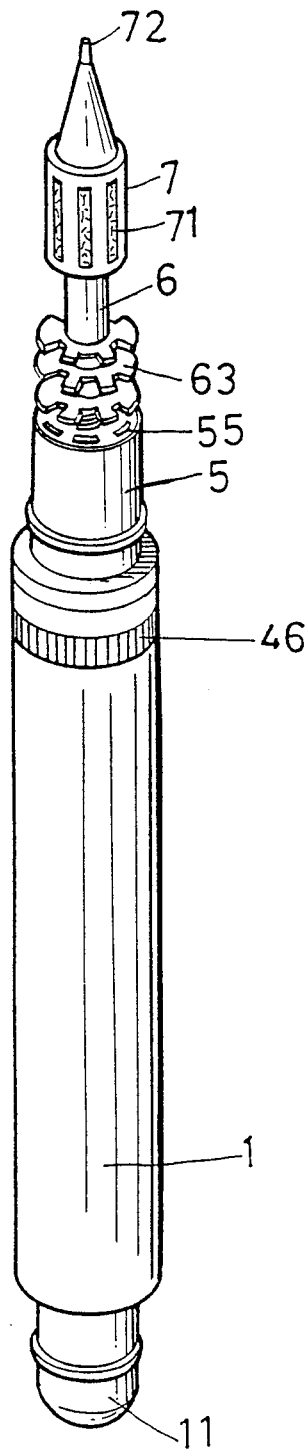
FIG. 1 is a perspective view of a gas soldering iron embodying the present invention.
Figure 2:
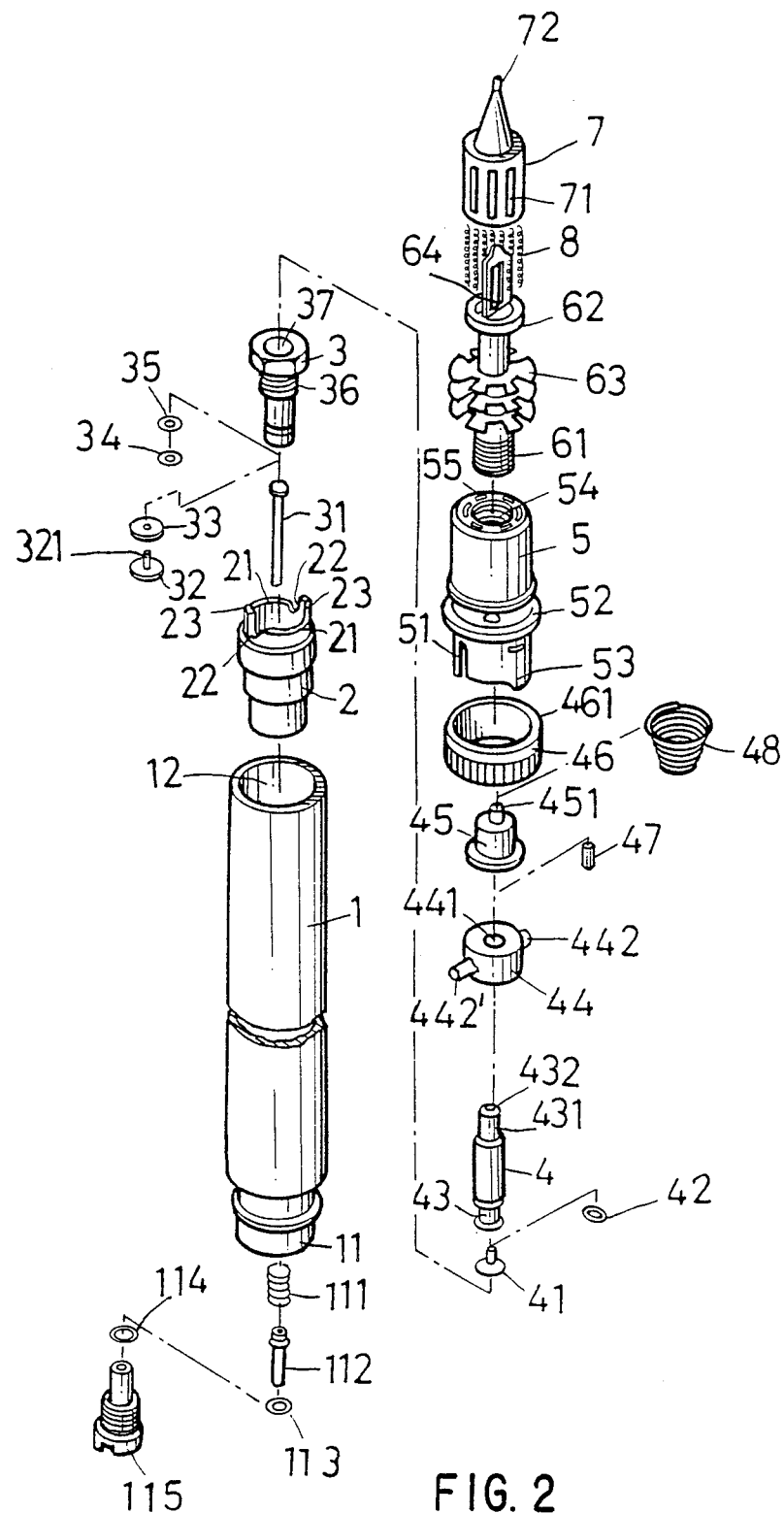
Fig 2 is a perspective exploded view of the present invention.
Figure 4:
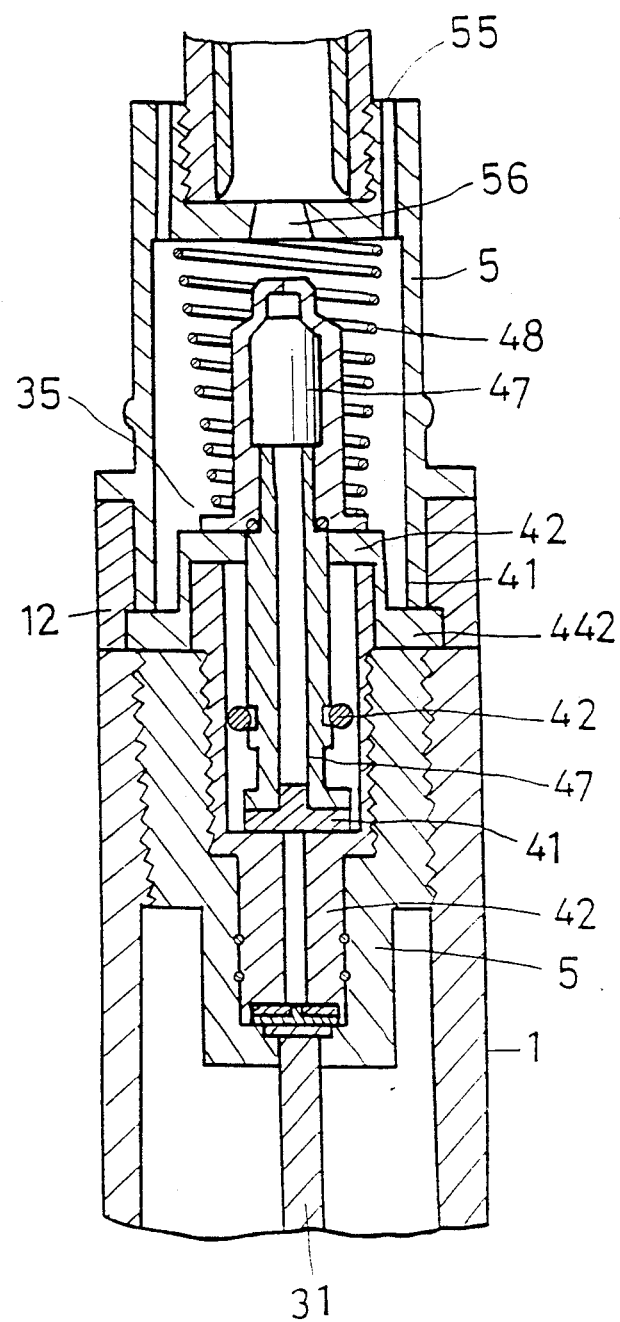
FIG. 4 is a partly sectional view of the present invention.

With reference to FIGS. 1 through 4, a gas soldering iron is comprises of a gas cylinder (1) a lower holder plate (2), a T-shaped mechanism (3), an elongated conduit tube (4), an upper holder plate (5), a metal tubular element (6), a cap-shaped soldering head (7), and a ignitor (8).

The gas cylinder (1) is including a gas filling mechanism (11) comprising a spring (111), a feed tube (112), two washers (113 and (114), and a hollow screw element (115). When in filling of gas, the feed tube (112) is pressed down, to get gas be filled through the boring bore of the feed tube (112) into the inner chamber of the gas cylinder (1). As soon as gas filling process is completed, the spring (111) will immediately force the feed tube (112) back to original place to let the boring bore of the feed tube (112) be blocked up, so as to prevent from overflowing of the gas (this is a public art, not the scope of the present invention).

The lower holder plate (2) which is mounted on the hole (12) of the gas cylinder (1) is integrally comprised of two symmetrical halves having tracks (21) and (21)', notches (22) and (22)', and stop pins (23) and (23)'.

The T-shaped mechanism (3) which is positioned in the lower holder plate (2) is having set therein an absorbent cotton bud (31) and a T-shaped absorbent cotton block (32) and connected with a sponge washer (33) and two O-rings (34) and (35) at the bottom. Therefore, the absorbent cotton bud (31) controls the gas to run along the projecting end (321) of the T-shaped cotton block (32) through the sponge washer (33). The T-shaped mechanism (3) is also including an outer thread (36) for connection with the inner thread of the lower holder plate (2) by means of screw joint.

The elongated conduit tube (4) which is serving as a filter means is including a movable tube (43) having connected thereto at the bottom end a T-shaped plate (41) and a washer (42), and having mounted thereon a switching element (44) through the center hole (441) by means of sleeve-joint, and also having connected thereto at the top end a cap (45) which is having a gas jet (451) set in the center to communicate with the boring bore of the movable tube (43). The switching element (44) is served to control gas flow rate, comprising two side rods 442 and (442)' respectively set in the notches (22) and (22)' the lower holder plate (2) and the notches of a revolving knob (46). When the revolving knob (46) is turning round, the side rods (442) and (442)' of the switching element (44) will be driven to move along the tracks (21) and (21)' to turn on the gas and to let the movable tube (43) be driven to increase output amount of the gas (that is, the flame is reinforced). When the side rods (442) and (442') are respectively stopped by the stop pins (23) and (23)', the output of the gas as at its maximum. The mini-sized gas jet (451) is having mounted thereon a mini-sized wire filter (47) to prevent from blocking of the hole. According to the present invention, the revolving knob (46) is having a spring 48 set therein When revolving force is released from the revolving knob (46), the revolving knob (46) will be immediately forced by the spring 48 to return back to original position.

The upper holder plate (5) is comprising an inner thread (54), a bottom notch (51) for passing therethrough of the side rods 441 and (442)' of the switching element (44), a lock flange (52) in the middle, and a track (53) at the bottom end to match with the track (21) of the lower holder plate (2) for moving therealong of the switching element (44).

The metal tubular element (6) is having an outer thread (61) for connection with the inner thread (54) of the upper holder plate (5) by means of screw joint, a plurality of circular radiator fins (63), a boring bore (64), and a circular seat (62) at the top for mounting thereon of the cap-shaped soldering head (7). Before fixation, an absorbent cotton rod is set in the metal tubular element (6), such that when gas is mixed with the air to run thereoff, it will be very simple and practical to light a fire.

Further, the upper holder plate (5) is comprising several air holes (55). When the gas which is injected through the gas jet (451) runs into the boring bore (56), the outside air will be induced therein through the air holes (55).

The cap-shaped soldering head (7) is comprising a plurality of side windows (71) for escaping therethrough of the gas after burning, and a soldering head (72) at the top end which will be rapidly heated for performing soldering process when the heating asbestos which is set therein is instantaneously burned.

According to the present invention, the gas jet (451) is mini-sized, to minimize gas consumption, and the design of the air holes (55) and the whole structure of the device makes it possible to achieve complete combustion of the gas ejected. Although the structure of the soldering head (72) is similar to the conventional soldering irons, the effective period of the present invention can be greatly increased even 3 times over the conventional ones with same consumption of gas.

With reference to FIGS. 5 and 6, the ignitor (8) is including a sleeve (85) connected with a clip (81) by means of locking axle (86), which sleeve (85) is having mounted thereon a friction wheel (84), a flint (83), and a spring (82), and comprising therein an indented guide channel (851). When not in use, the ignitor (8) may be mounted on the cap-shaped soldering head (7) by means of the indented guide channel (851). When in use, the ignitor (8) is removed from the cap-shaped soldering head (7) lighting a fire.

In conclusion, the present invention makes use of a switching element controlled by a revolving knob to let gas be delivered by means of permeation process through minisized feed tube and gas jet so as to extend the effective period and increase combustion efficiency.

What is claimed:

1. A gas soldering iron, including
   a gas cylinder, having a tubular body comprising a gas filling mechanism for filling therein of gas;
   a lower holder plate mounted on said gas cylinder at the top, comprising at the top a pair of symmetric tracks, a pair of symmetric notches and a pair of symmetric stop pins;
   a T-shaped mechanism for gas inlet control, having a tubular body comprising an outer thread and being fixedly set in said lower holder and connected thereto by means of screw joint;
   an elongated movable conduit tube in said T-shaped mechanism, said movable tube having mounted thereon at the top a switching element, a gas jet cap, a spring and a revolving knob to control gas flow rate;
   an upper holder plate having a tubular body comprising several air holes at the top, an inner thread, a track at the bottom end to match with said lower holder plate for moving therealong of said switching element;
   a metal tubular element having outer thread at the bottom end for connection with the inner thread of said upper holder plate, a boring bore through which gas is ejected, a plurality of radiator fins mounted thereon to help distribution of heat energy;
   a cap-shaped soldering head having set therein an instantaneously heating asbestos, and comprising a plurality of side windows and a soldering head at the top;
   an ignitor detachably mounted on said cap-shaped soldering head, comprising a friction wheel, a flint, and a spring;
   characterized in that when said revolving knob is turned on, the gas will be released from said gas cylinder to produce flame by means of the operation of said ignitor, so as to burn hot said soldering head for performing soldering process.

2. The as soldering iron as set forth in claim 1, wherein said gas jet cap is comprising a fine gas jet being mounted on said movable tube at the top to control gas flow rate to further match with the air for complete combustion.

3. The gas soldering iron as set forth in claim 1, wherein said air holes of said upper holder plate are served for penetration therein of the outside air to further run through the boring bore of said metal tubular element with the released gas concomitantly.

4. The gas soldering iron as set forth in claim 1, wherein the gas which is released through the gas jet of said gas jet cap runs into the boring bore of said upper holder plate to mix with the air circulated through said air holes of said upper holder plate to further run through said metal tubular element into said instantaneous heating asbestos of said cap-shaped solder head.

* * * * *